United States Patent [19]

Mehlum et al.

[11] 4,314,739
[45] Feb. 9, 1982

[54] HOLOGRAPHIC METHOD FOR CONVERSION OF WAVES

[75] Inventors: Even Mehlum; Odd Løvhaugen, both of Oslo, Norway

[73] Assignee: Sentralinstitutt for industriell forskning, Oslo, Norway

[21] Appl. No.: 42,510

[22] Filed: May 25, 1979

[30] Foreign Application Priority Data

May 30, 1978 [NO] Norway ................................ 781868

[51] Int. Cl.³ ............................................. G03H 3/00
[52] U.S. Cl. ...................................... 350/3.66; 73/603
[58] Field of Search .................... 350/3.66, 3.67, 3.85; 73/603–608

[56] References Cited

U.S. PATENT DOCUMENTS

3,756,683  9/1973  Smith, Jr. ............................ 350/3.72

Primary Examiner—John K. Corbin
Assistant Examiner—Bruce Y. Arnold
Attorney, Agent, or Firm—Wenderoth, Lind & Ponack

[57] ABSTRACT

A new halographic method for converting one wave into another wave by means of a hologram is disclosed. This method comprises mixing an object wave with a reference wave whose wave front in the hologram plane is different from that of the actual reconstruction wave in the same plane. The phases and possibly also the amplitudes of these two wave fronts are combined in such a way that compensation is obtained for imaging errors caused by mutual inconsistencies between the wavelength ratio, the hologram scaling and the object scaling, and a displacement of the reconstructed object relative to the hologram. The reference wave and the reconstruction wave are chosen so that the converted object wave field becomes "as equal as possible" to a wave field coming from another but geometrically similar object at a different wavelength. In an example concerning seismic holography a formular for choosing a proper synthetic reference wave is given. The formula together with a computer program for acoustic wave propagation is used to compute the transmission function of a synthetic hologram, from which faithful optical reconstructions are obtained of simulated objects.

9 Claims, 9 Drawing Figures

HOLOGRAPHIC METHOD FOR CONVERSION OF WAVES

BACKGROUND OF THE INVENTION

The present invention relates to a method for holographic conversion of one wave being emitted from a first object, into another wave which is identical to the wave another but geometrically similar object would emit at a wavelength which may be different from the wavelength of the former wave. The objects may be selfradiating or consist of scattering elements, and the converted wave may be of another physical nature than the original wave.

In holography a wave front to be recorded is brought to interfere physically or synthetically with a reference wave front and the interference pattern is recorded in a hologram. Subsequently the recorded wave is reconstructed physically either in its original or in a converted form. If the actual reconstruction wave is equal to the reference wave, the reconstructed wave is identical to the recorded wave. If the reconstruction wave is different from the reference wave, the reconstructed wave gets converted in relation to the recorded wave. Until now it has been a requirement that the reference wave front and the reconstruction wave front be similarly shaped in the hologram.

Conversion of waves as mentioned above has been known previously in connection with linear scaling of holograms. By this known type of wave conversion, however, one cannot obtain a scaled reconstructed wave which is shaped similarly to the recorded wave, unless the hologram, the object and the wavelength all are scaled linearly by the same factor. With a recording wavelength $\lambda_1$ and a different reconstruction wavelength $\lambda_2$ a change of the linear hologram dimensions by a factor $1/M$ will result in a transverse (parallel to the hologram) positional translation of points in the object by a factor $M$, and a longitudinal positional translation of points by a factor $M^2\lambda_1/\lambda_2$. Consequently, the reconstructed object gets distorted throughout its depth unless the factor $M$ is chosen equal to $\lambda_2/\lambda_1$. For practical reasons the proper choice of the factor $M$ may be made only in cases in which the wavelength differences are minor. In all other cases the reconstructed object usually gets so small that it is necessary to enlarge it optically in order to obtain a satisfactory parallax-effect. By such magnification, however, the depth distortion is regenerated.

The scaling problem has been treated thoroughly in the literature, but has not been solved. In the descriptions found in the patent literature concerning acoustic holography and in particular seismic holography, directions for linear scaling of the wave front as recorded in the hologram plane have been given by way of a number of examples. By such scaling a compromise is made with regard to the wavelength ratio in order to obtain suitable hologram dimensions. Thus the reconstructed object is suitably scaled, but inevitably gets distorted. In connection with scaling of acoustic holograms it has been stated in the literature that the difference between the recording wavelength and the reconstruction wavelength excludes the possibility of obtaining a realistic three-dimensional reconstruction of the object.

SUMMARY OF THE INVENTION

The purpose of the present invention is to provide a method that, with or without linear hologram scaling, makes it possible to convert holographically a recorded wave into a reconstructed wave which comes from an object that is shaped similarly to the original object, but that may have been moved relative to the hologram. Thus the invention aims at solving the scaling problem that has heretofore been considered insoluble.

The solution of the scaling problem has been obtained by the method according to the invention, which is characterized by the use of a reference wave whose wave front in the hologram plane is different from the wave front of the actual reconstruction wave in the same plane, and by the combination of the phases (and possibly also the amplitudes) of these wave fronts so that compensation is obtained for imaging errors due to mutual inconsistencies between the wavelength ratio, the hologram scaling and the object scaling, and to a possible displacement of the reconstructed object relative to the hologram.

The method covers any provision for reference and reconstruction waves, where at least one of the waves is different from corresponding waves provided for in known techniques, and where the waves are of such a nature that they satisfy the wave front principle defined above.

As a result of this invention it is now possible to obtain realistic three-dimensional reconstructed images when the recording wavelength is different from that of the reconstruction.

The wave front principle according to the invention is generally valid to the extent that the holographic principle can form a basis for the application, even though present technology excludes conversion of particular types of mechanical waves, for example water waves. It is known that the holographic principle is valid for different categories of waves, such as acoustic waves, optical and infrared waves, X-rays and electron rays as well as radioactive radiation. Conversion according to the invention may be performed from one category of waves into another, or within one and the same category when the wavelength spectrum therein makes conversion desirable. The immediate practical consequence of this possibility is that the development of acoustic holography, X-ray and electron microscopy can be advanced. An additional result of the invention is that the holographic principle can be applied within new technical fields.

The method can be realized by means of various equipments, for instance by means of holograms that are provided on the basis of synthetically produced interferograms, with the aid of optical lens systems or acoustic lenses, by transformation of acoustic holograms to optical holograms by the help of liquid surfaces, et cetera. Additionally, a wave may be transformed into electrical signals in known manners, whereupon the signals may be modified in electronic circuits and then may be transformed into a light wave that corresponds to the converted wave. In connection with synthetic holography and the application of a synthetic reference wave, the modification is preferably performed with respect to the reference wave only, in a computer, after having chosen the reconstruction wave. The amplitude of the reference wave is often a constant.

The holograms which are used in the method may be both reflection holograms and transmission holograms, and each of these hologram types may in turn be phase holograms or amplitude holograms.

BRIEF DESCRIPTION OF THE DRAWINGS

The invention will now be described in more detail by means of examples of performance, and by means of mathematical considerations, with reference to the accompanying drawings, wherein.

DETAILED DESCRIPTION OF THE INVENTION

As a starting point for the following supplementary description, reference will first be made to known holographic techniques.

Figure 1:
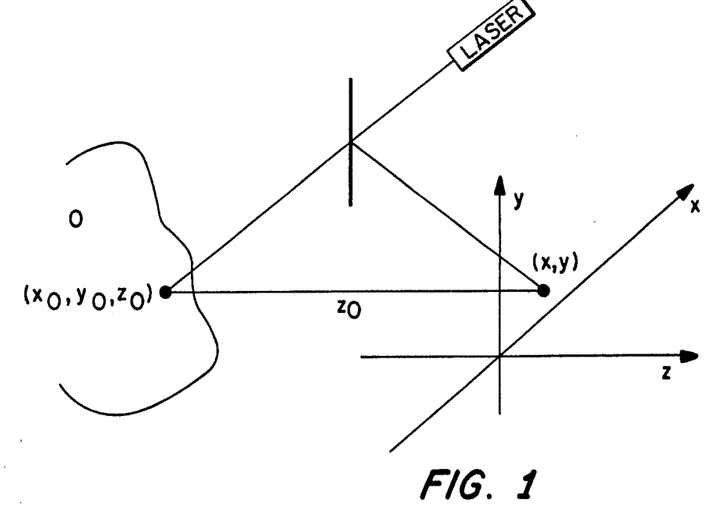
FIG. 1 is a schematic drawing of a known holographic arrangement comprising a laser, an object and a hologram.

In FIG. 1 an object O is shown in a cartesian coordinate system x,y,z. The object O reflects an object wave with wave front $O(x,y)$ in the plane x,y at a distance $z_o$ from a point $(x_o, y_o, z_o)$ in the object.

If the wavefront $O(x,y)$ is mixed with a known reference wave front $R(x,y)$, and the interference pattern between these wave fronts is recorded on a photographic film (the hologram), then the density variations of the hologram are given by $$t(x,y) = \text{const.} \cdot |O(x,y) + R(x,y)|^2$$

Upon reconstruction of the wavefront $O(x,y)$ with a reconstruction wavefront $B(x,y)$, $t(x,y)$ is the attenuation which the complex amplitude of the wavefront $B(x,y)$ suffers at the point $(x,y)$ in transmission through the hologram. In the plane just behind the hologram plane, one has a wavefront $$\begin{aligned}
U_i(x,y) &= t(x,y) \cdot B(x,y) \\
&= \text{const.} \cdot |O(x,y) + R(x,y)|^2 \cdot B(x,y) \\
&= U_{i1} + U_{i2} + U_{i3} + U_{i4} \\
U_i(x,y) &\propto |R(x,y)|^2 \cdot B(x,y) + |O(x,y)|^2 \cdot B(x,y) \\
&\quad + O(x,y) \cdot R^*(x,y) \cdot B(x,y) + O^*(x,y) \cdot R(x,y) \\
&\quad \cdot B(x,y)
\end{aligned}$$

wherein * denotes the complex conjugate of.

This holographic equation shows that by letting $B(x,y) = R(x,y)$, the third term $$U_{i3}(x,y) = \text{const.} \cdot |R(x,y)|^2 \cdot O(x,y)$$

yields the original object wavefront $O(x,y)$ in return, but attenuated by the factor const. $\cdot |R(x,y)|^2$ which can be chosen equal to 1. This means that the reference wavefront $R(x,y)$ in this case is equal to the reconstruction wavefront $B(x,y)$ except for a constant factor.

Developments within the field of holography have been based upon the assumption that the reference wavefront and the reconstruction wavefront with the exception of a constant, must have the same complex amplitude in the hologram plane, and that any difference in complex amplitude between the two wavefronts inevitably leads to distortions and other imaging errors in the reconstructed object. This assumption has been used as a basis for holographic scaling of waves also in cases when the recording wavelength is different from the reconstruction wavelength. Consequently, scaled reconstructions have hitherto suffered from errors due to the fact that the wavelength ratio, the hologram demagnification and object demagnification are not the same, as the assumption above requires. By the present invention, however, it has been found that such assumption is not generally valid. Contrary to what has been assumed, it has thus been proved possible to obtain a converted wavefront that reconstructs another but similarly shaped object which may be displaced relative to the hologram. This has been obtained by using a reference wavefront which is different from the reconstruction wavefront, whereby compensation is obtained for those errors which occur when recording is performed with one wavelength and reconstruction with another, and when the demagnification of the hologram and the object are not both equal to the wavelength ratio.

This invention is generally applicable to holographic conversion of waves, and can be explained from the holographic equation given above. The fundamental point in this respect is the very fact that $O(x,y) \cdot R^*(x,y)$, upon reconstruction with $B(x,y)$, gives rise to that object wavefront $O'(x',y')$ which a similarly shaped object would emit at another wavelength, provided that one chooses a correct combination of $R^*(x,y)$ and $B(x,y)$. This does not imply exclusively that $R^*(x,y)$ must be equal to $B(x,y)$ (except for a complex constant) in order to achieve a non-distorted reconstruction, as has hitherto been taken for granted.

According to a practical embodiment of the invention, a correct combination of $R^*(x,y)$ and $B(x,y)$ is chosen by modification of the reference wave and/or reconstruction wave so that the phases and amplitudes of these wavefronts in the hologram become unequal to each other to such an extent that the above mentioned errors are compensated for, whereby the converted reconstructed wave becomes identical to the wave that another object similar to the original object would emit at another wavelength. It should be noticed that the similarity is not exact, but is correct for all practical purposes. The amplitudes mentioned may be constants.

The scaling method according to the invention comprises a step of finding the reference wave or the reconstruction wave or a combination of these by an optimization process, whereby the field from a point source in the object after conversion is to be made "as equal as possible" to the field from a point source which ideally satisfies the requirements which the conversion is desired to satisfy. The medium between the object and the hologram may be inhomogenous and anisotropic if so desired. The criterion of what is "as equal as possible" is determined by the use of the converted wavefront. In case the converted wave is to be viewed by the eye, the criterion of what is "as equal as possible" may be set by requiring the minimal square deviation (the $L^2$-norm) between the converted wave and the ideal wave to satisfy certain requirements.

The assertion above that the method is correct in general will be supported below by means of a mathematical consideration of the conversion procedure.

Figure 2:
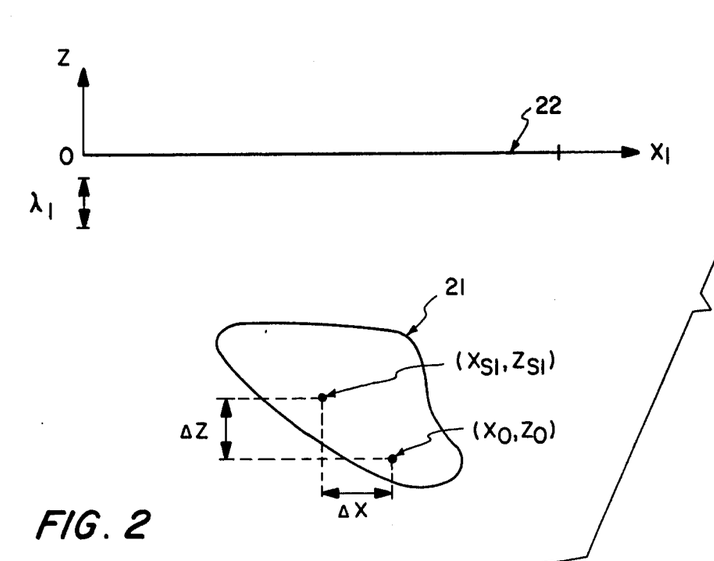
FIG. 2 shows, in a cartesian coordinate system, a recording at a wavelength $\lambda_1$ in which there is an ideal object point source $(x_o, z_o)$, a reference point $(x_{s1}, z_{s1})$ in the object, and a hologram plane $(x_1, 0)$.

Reference is now made to FIG. 2 which for the sake of simplicity shows a two-dimensional case, the third dimension being included symmetrically in the considerations.

A wavefront from an ideal point source at the point $(x_o, z_o)$ in an object 21 to be recorded, is described in the plane $(x_1, 0)$ by $$\frac{e^{i\phi}}{r} = \frac{e^{ik_1 r}}{r} = \frac{e^{ik_1 \sqrt{(x_o - x_1)^2 + z_o^2}}}{\sqrt{(x_o - x_1)^2 + z_o^2}}$$

where $k_1 = 2\pi/\lambda_1$. The coordinates $(x_o, z_o)$ of the ideal point source refer to a reference point $(x_{s1}, z_{s1})$ in the object 21, i.e. $(x_o, z_o) = (x_{s1} + \Delta x, z_{s1} + \Delta z)$.

If this wavefront is recorded as a function of $x_1$, and if the hologram coordinate $x_1$ is changed to $x'$ by a linear scaling in the same coordinate system with an appropriate scaling factor m so that $x_1 = mx'$, the following expression in $x'$ is obtained:

$$\frac{e^{id}}{r} = \frac{e^{ik_1 \sqrt{(x_o - mx')^2 + z_o^2}}}{\sqrt{(x_o - mx')^2 + z_o^2}}$$

If the reference wave with which the wave field $e^{id}/r$ is to be mixed, is denoted $R^*(x')B(x') = \exp[i\phi_{R^*}(x')]/A_{R^*}(x')$, the following expression is obtained for the third term in the holographic equation above:

$$U(x') = \frac{e^{ik_1 \sqrt{(x_o - mx')^2 + z_o^2}}}{\sqrt{(x_o - mx')^2 + z_o^2}} \cdot \frac{e^{i\phi_{R^*}(x')}}{A_{R^*}(x')}$$

What is desired from the hologram used for conversion, is a reconstruction scaled linearly in such a way that the reconstructed object wave apparently comes from an identical but scaled object. In this case the reconstructed object wave is a spherical wave coming from the point $(x_{s2} + \alpha\Delta x, z_{s2} + \gamma\Delta z) = (x_i, z_i)$, where $(x_{s2}, z_{s2})$ is a reference point in the reconstructed object 31 in FIG. 3, and $\alpha$ and $\gamma$ are constants. Thus, $$\frac{e^{ik_1 \sqrt{(x_o - mx')^2 + z_o^2}}}{\sqrt{(x_o - mx')^2 + z_o^2}} \cdot \frac{e^{i\phi_{R^*}(x')}}{A_{R^*}(x')} \text{ "="} \quad (1)$$

$$\frac{e^{ik_2 \sqrt{(x_i - x')^2 + z_i^2}}}{\sqrt{(x_1 - x')^2 + z_i^2}} = I(x')$$

wherein $k_2 = 2\pi/\lambda_2$ and "=" means "as equal as possible" and implies an optimization of $R^*(x')B(x')$, where, in the three-dimensional case:

$$O(x',y') = \frac{e^{ik_1 \sqrt{(x_o - mx')^2 + (y_o - my')^2 + z_o^2}}}{\sqrt{(x_o - mx')^2 + (y_o - my')^2 + z_o^2}} \quad (2)$$

$$R^*(x',y') \cdot B(x'y') = \frac{e^{i\phi_{R^*}(x',y')}}{A_{R^*}(x',y')} \quad (3)$$

$$I(x',y') = \frac{e^{ik_2 \sqrt{(x_i - x')^2 + (y_i - y')^2 + z_i^2}}}{\sqrt{(x_i - x')^2 + (y_i - y')^2 + z_i^2}} \quad (4)$$

It can be shown that the expression (1) as solved with respect to the optimal reference wave with which the recorded object wave front is to be mixed, in the three-dimensional case, and when the object is not displaced relative to the hologram, leads to the following formula when minimal square deviation is required:

$$\frac{\exp[i\phi_{R^*}(x',y')]}{A_{R^*}(x',y')} = \frac{\{(x_{sI} - mx')^2 + (y_{sI} - my')^2 + z_{sI}^2\}^{\frac{1}{2}}}{\{(x_{sI} - x')^2 + (y_{sI} - y')^2 + z_{sI}^2\}^{\frac{1}{2}}} \cdot \quad (5)$$

$$\exp\{-ik_1[(x_{sI} - mx')^2 + (y_{sI} - my')^2 + z_{sI}^2]^{\frac{1}{2}} +$$

$$ik_2[(x_{sI} - x')^2 + (y_{sI} - y')^2 + z_{sI}^2]^{\frac{1}{2}}\}$$

The consideration is analogous when scaling is not included. Then $m = 1$ in the formula above.

This formula shows that wave conversion, including scaling of the hologram coordinates, can be performed by modifying the reference wave and/or the reconstruction wave as given above.

In physical holography, this modification may be performed for instance by means of a particular hologram for generation of the reference wave and/or a particular hologram for generation of the reconstruction wave. These holograms may be produced synthetically according to known principles by using an electronic computer and an electron beam apparatus, a controlled laser beam or corresponding exposure equipment. Alternatively, one may use an optical system which is dimensioned in such a way that the desired modification is obtained. In connection with synthetic holography, e.g. as a step in a process for visualizing the reconstructed object of an acoustic hologram recording, the formula above will be used in a computer to control the equipment used for generation of the synthetic optical hologram.

In the following, the method will be explained by means of a more detailed description of an example taken from a practical situation where a recorded wave field $f(x_1, y_1)$ is at hand, which field is desired to be converted.

The recorded wave field $f(x_1, y_1)$ is converted by multiplying it by a complex transmission function. This operation is performed in practice in a computer. In common optical holography the transmission function is equal to the complex conjugate of the reference wave which is added during recording. Thus, it is preferred to denote the function as "the synthetic reference wave".

Now, let it be imagined that the synthetic reference wave is an arbitrary complex function, $R(x_1, y_1)$, of the coordinates in the recording plane. Therefore, the converted wave field is $$f(x_1, y_1) \cdot R(x_1, y_1) \quad (6)$$

It is desired that the converted wave field satisfy the following requirements (see FIGS. 2 and 3):

1. The converted wave field shall have a wavelength $\lambda_2$ which is different from the wavelength $\lambda_1$ of the recorded wave field.

2. The converted wave field shall be demagnified by a factor m relative to the recorded wave field, so that the coordinates $x',y'$ after the transformation shall be connected to the recording coordinates according to the following relations:

$$x' = (1/m)x_1,$$

$$y' = (1/m)y_1. \quad (7)$$

In the general case m can be assumed to be a function of $x_1, y_1$.

3. All distances in the object in the x, y or z direction shall be scaled linearly during the reconstruction. In other words, if there is chosen a reference point $(x_{s1}, y_{s1}, z_{s1})$ in the object so that the coordinates $x_o, y_o, z_o$ of an arbitrarily chosen object point are given by $$x_o = x_{s1} + \Delta x,$$

$$y_o = y_{s1} + \Delta y,$$

$$z_o = z_{s1} + \Delta z, \quad (8)$$

then it is required that the coordinates $x_i, y_i, z_i$ of the reconstructed point shall be $$x_i = x_{s1} + \alpha \Delta x,$$

$$y_i = y_{s1} + \beta \Delta y,$$

$$z_i = z_{s1} + \gamma \Delta z, \quad (9)$$

wherein $\alpha$, $\beta$ and $\gamma$ are constants.

4. The object with its reference point $(x_{s1}, y_{s1}, z_{s1})$ may be displaced relative to the coordinate system of the hologram, to a point $(x_{s2}, y_{s2}, z_{s2})$ while the linear scaling-down of the object is maintained. In order to fulfil this requirement the coordinates $x_i, y_i, z_i$ of the reconstructed object must be given by $$x_i = x_{s2} + \alpha \Delta x,$$

$$y_i = y_{s2} + \beta \Delta y,$$

$$z_i = z_{s2} + \gamma \Delta z. \quad (10)$$

Figures 3, 7:
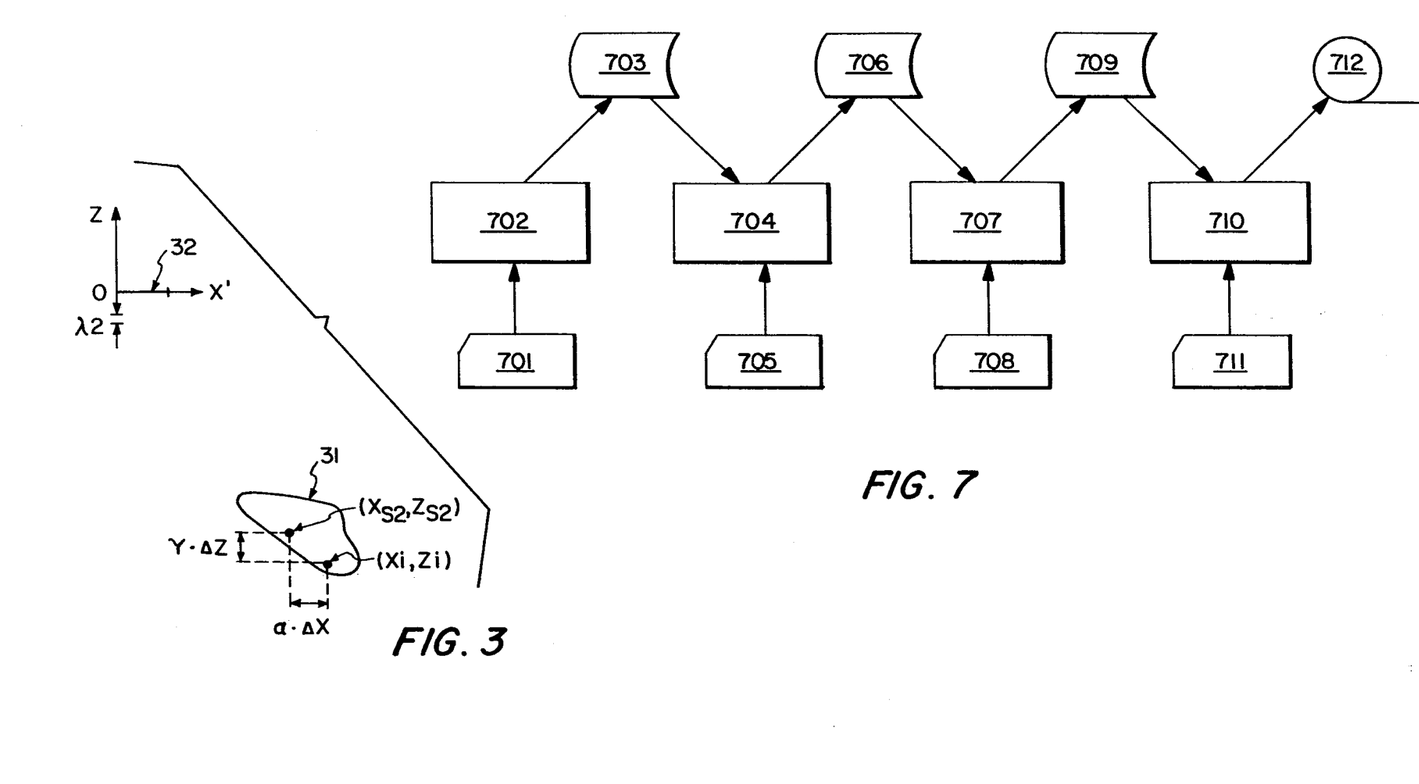
FIG. 3 in relation to FIG. 2 shows the reconstructed point $(x_i, z_i)$, the reference point $(x_{s2}, Z_{s2})$ in the reconstructed object, and the scaled hologram plane $(x', 0)$. The wavelenth is $\lambda_2$.
FIG. 7 is a sketch of the entire calculation procedure in a simulation process.

5. All requirements above shall be fulfilled without allowing the absolute value of the phase error to exceed a pre-chosen limiting value $\epsilon > 0$. From this criterion one can determine within which recording area 22 the object points have to be positioned, as measured from the reference point $(x_{s1}, y_{s1}, z_{s1})$, and within which reconstruction area 32 the point $(x_{s2}, y_{s2}, z_{s2})$ has to be located relative to $(x_{s1}, y_{s1}, z_{s1})$.

A wave field given by the formula $$\hat{f}(x',y') = \frac{e^{i\frac{2\pi}{\lambda_2}\sqrt{(x_i - x')^2 + (y_i - y')^2 + z_i^2}}}{\sqrt{(x_i - x')^2 + (y_i - y')^2 + z_i^2}} \quad (11)$$

where $x',y'$ are given by (7) and $x_i, y_i, z_i$ are given by (10), satisfies the requirements 1-4 above.

The conversion (6) of the recorded wave field is performed so that the result becomes as equal as possible to the wave field (11). The problem may be formulated mathematically as an optimization problem, in which several different criteria may be used to define what is meant by the term "as equal as possible". Examples of three such criteria will be given:

(a) The square deviation between the converted wavefront and the wavefront from the ideal point, integrated across the hologram plane, is to be a minimum. The integration may also be extended over a desired volume of the object.

(b) The largest deviation in complex amplitude between the converted wave field and the wave field from the ideal point, is to be a minimum.

(c) The portion of the area in the hologram plane where the deviation in complex amplitude is less than a pre-selected value between the converted wave field and the wave field from the ideal point, is to be a maximum.

Figure 4:
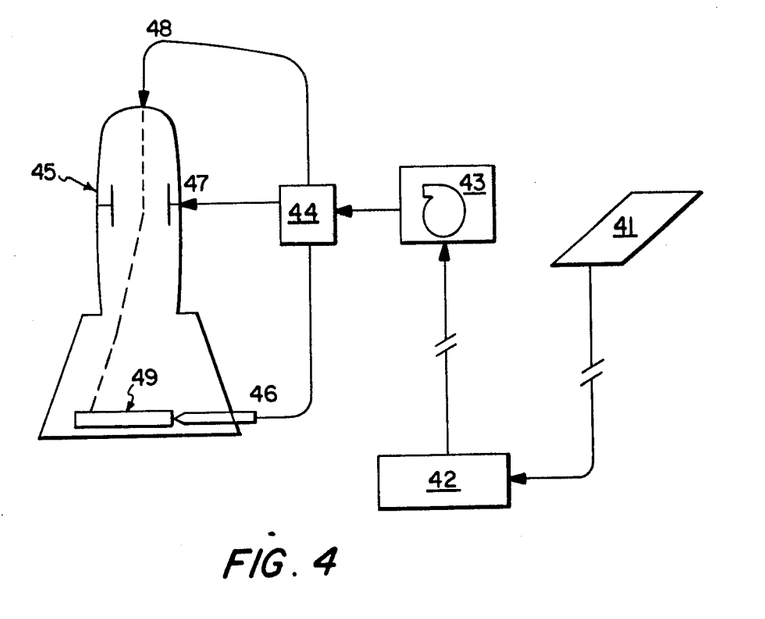
FIG. 4 is a schematic drawing of known equipment for production of synthetic holograms.

A preferred embodiment of the invention, related to synthetic holography, will now be described with reference to FIG. 4.

Herein 41 denotes geometrical data which describe numerically a holographic recording of an object wavefront at a wavelength $\lambda_1$. The recording was performed in a known manner. These data were supplied to a large computer 42 and processed by means of a program for calculation of the wavefront in relation to a hologram plane according to known computational procedures. Further, the computer 42 was supplied with a program for scaling of the hologram coordinates in a known manner, and for calculation of a synthetic reference wavefront according to the formula (5) above. Still further, a program was supplied for calculating the hologram values of the interference pattern between the wavefront at wavelength $\lambda_1$ and the reference wavefront. By means of a fourth program of a known type the corresponding exposure data were calculated. The calculated exposure data were supplied to a magnetic tape station 43 for a small computer 44 which was used to control the line shift 46, the deflection 47 and the intensity 48 of the electron beam in a scanning electron microscope 45. The electron beam was used to expose an electron sensitive material, e.g. a photoresist 49, which was then treated in a known manner for the provision of a hologram of the object wavefront.

Figure 5:
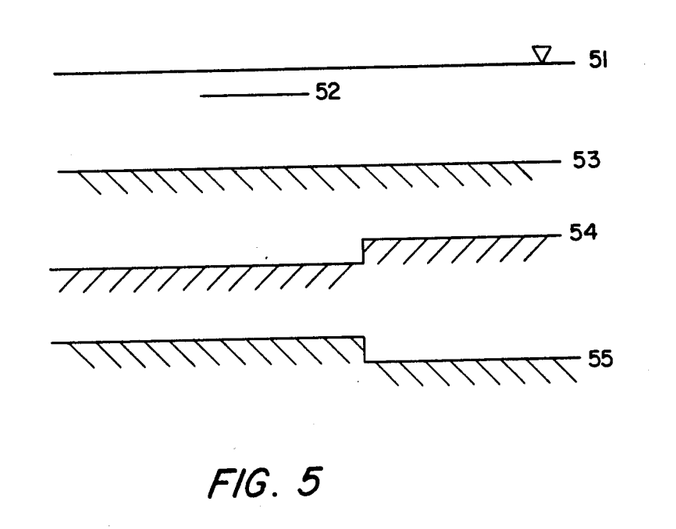
FIG. 5 shows a model of a seismic structure.

By means of this system experiments were performed with a computer model for determination in a given plane of the wavefront from a plane object which consisted of various known layers, and which was positioned parallel to the given plane. In FIG. 5 these layers are shown as a simulated sea level 51, a sea bed 53 and sound reflecting surfaces 54 and 55 which should represent different seismological layers. A number of points in the seismological layers 54 and 55 were emitting sound which, in the acoustic hologram 52, should represent the object wavefront. In the experiments the formula (5) was used for converting sound into light.

The computer model consisted of four main programs as mentioned above, namely:

(a) The program for calculating the propagation of the wavefront from the object to the hologram plane.

(b) The program for linear scaling of the wavefront and for multiplying it by the synthetic reference wave.

(c) The program for calculation of hologram values.

(d) The program for calculation of exposure data.

(a) Wave propagation

The propagation of a wavefront from one layer to the hologram plane is described by the following formula:

$$h(x,y) = \int\int_{-\infty}^{\infty} O(x',y') \frac{z}{i\lambda} \frac{e^{ik\sqrt{(x-x')^2 + (y-y')^2 + z^2}}}{(x-x')^2 + (y-y')^2 + z^2} dx'dy' \quad (12)$$

$$= \int\int_{-\infty}^{\infty} O(x',y') E(x-x', y-y') dx'dy'$$

wherein $O(x',y')$ = the wavefront emitted from the object plane.

$z$ = the distance between the object plane and the hologram plane.

$\lambda$ = wavelength.

$k$ = angular wave number.

$h(x,y)$ = the wavefront in the hologram plane.

This formula constitutes the core of the wave propagation program. In the application of the formula Fourier-techniques were used in order to obtain an acceptable computer time. The formula (12) is a convolution integral and may be calculated in the following way:

$$H(f_x, f_y) = F\{O(x',y')\} \cdot F\{E(x',y')\}$$

$$h(x,y) = F^{-1}\{H(f_x, f_y)\}$$

For calculation of the Fourier transforms we used a Fast Fourier Transform algorithm was used.

Figure 6:
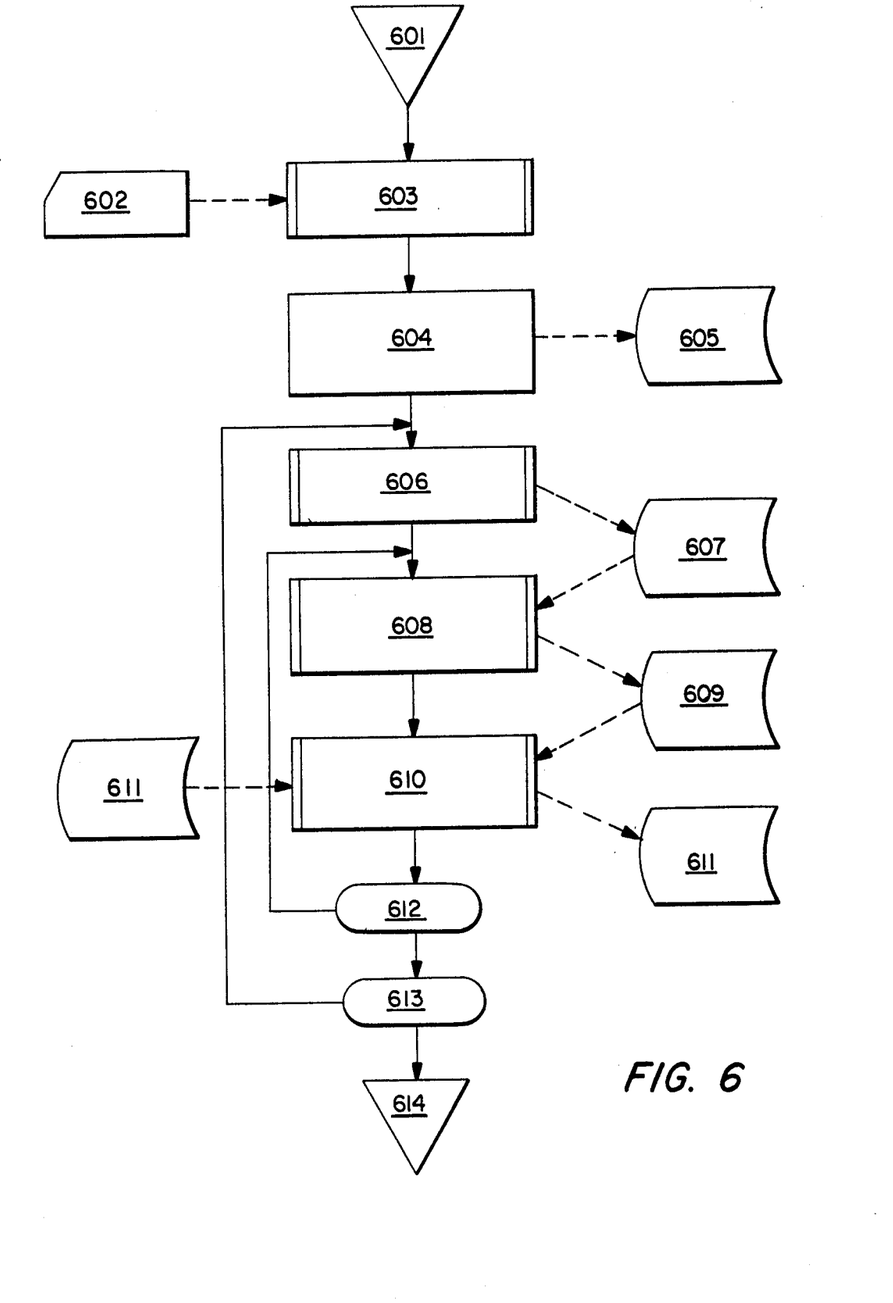
FIG. 6 schematically shows the wave propagation program.

In FIG. 6 the wave propagation program is shown schematically. Dotted lines represent data flow and solid lines represent program flow. After start denoted 601, input parameters from 602 were read into the block 603. In the block 604 inter-program parameters were generated and supplied to an output file 605 and to the block 606 where the wavefront from one layer was generated, whereafter the wavefront was fed via a working file 607 to the block 608 where the wavefront was transformed to the hologram plane. The transformed wavefront was transferred via a working file 609 to the block 610 wherein the wavefront was accumulated in the hologram plane. The accumulated wavefront was transferred to an output file 611 and thence back to 610 wherein the wavefront was accumulated in the hologram plane. The accumulated wavefront was transferred to an output file 611 and thence back to 610 when the sum was needed. The block 612 stands for several subholograms, 613 stands for several planes and 614 indicates stop.

(b) Scaling and conversion of the wavefront

The purpose of this program is to scale the recorded wavefront linearly and multiply it by the synthetic reference wave given by formula (5).

(c) Calculation of hologram values

The objective of this program is to calculate phase, amplitude or intensity in the hologram plane.

(d) Calculation of exposure data

The program calculated exposure instructions on the basis of the calculated hologram values for storing on magnetic tape which is adapted to the exposure equipment.

FIG. 7 is a sketch of the entire calculation procedure in a simulation. The block 701 represents cards with input parameters and 702 stands for the program for calculation of the wavefront across the hologram. The calculated wavefront was supplied to a mass storage 703 and further to a program 704 for conversion of the wavefront. The block 705 indicates a card with input parameters. The converted wavefront was transferred to a mass storage 706 and further to a program 707 for calculation of the hologram values. Input parameters came from a card 708. Hologram data went to a mass storage 709 and further to a program 710 for calculation of exposure data on the basis of input parameters from a card 711. The calculated exposure data went to a magnetic tape station 712, corresponding to the station 43 in FIG. 4.

The simulations which were performed with the model may be summarized as follows:

(1) Object: SI, EI, OIL (in different layers).
Size of object: $0.13 \times 0.13$ mm$^2$.
Distance between samples in the object: $2\mu$.
Size of hologram: $1 \times 1$ mm$^2$.
Distance between samples in the hologram: $2\mu$.
Distance to hologram: 4.74; 6.74; 8.74 mm for SI, EI and OIL respectively.
Hologram scaling: Linear scaling-down of the object, hologram and wavelength by the same factor.
Hologram type: Phase and intensity (binary).
Result: Satisfactory both by reconstruction with a hologram of one single layer and by reconstruction with a hologram of configurations of two or three layers. In the two latter cases we obtained very good focusing of each layer was obtained.

(2) Object: SI.
Size of object: $0.98 \times 0.98$ mm$^2$.
Distance between samples in the object: $2 \cdot 10^{-2}$ cm.
Size of hologram: $1 \times 1$ mm$^2$.
Distance between samples in the hologram: $2\mu$.
Distance to hologram: 40 cm.
Wavelength scaling: Scaling factor 100.
Hologram scaling: Scaling factor 100.
Object scaling: Scaling factor 1.
Hologram type: Phase (binary).
Result: Very satisfactory reconstruction. See FIG. 8.

Thus, with a two-dimensional recording one can obtain a three-dimensional, practically non-distorted visual image of opaque structures. The simulations performed show that a wavefront can be re-created to give a reconstructed object of high resolution even in cases in which the wavelength ratio differs substantially from the object and hologram scaling factors. In general it has been experienced that the error which is made when the hologram is scaled linearly is compensated for by the use of the method according to the invention.

Figure 8:
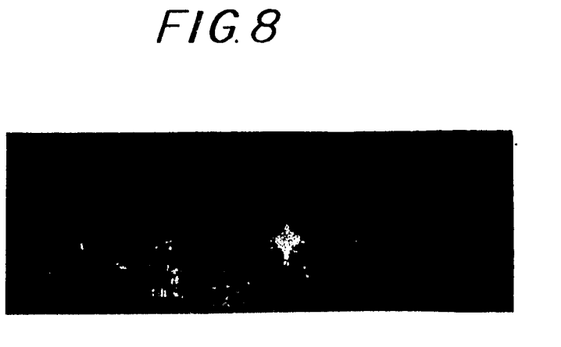
FIG. 8 shows a reconstructed object from an experiment in which a simulated wave front was recorded.
Figure 9:
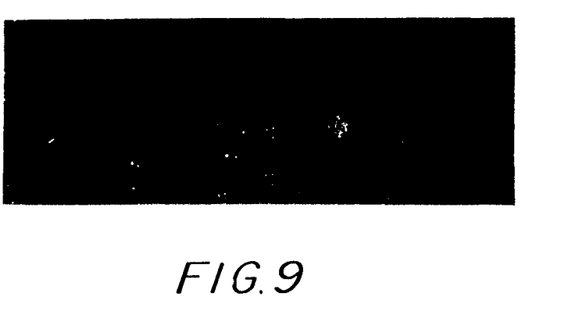
FIG. 9 shows the reconstruction of FIG. 8, with the object moved 1 cm closer to the hologram.

An example of displacing the reconstructed object was performed as well. The object and the recorded wavefront were the same as under item (2) above. In this case the reconstruction was displaced 1 cm to the left towards the hologram, relative to the reconstruction according to item (2). FIG. 8 shows the reconstruction without displacement, while FIG. 9 shows the reconstruction when displacement was included.

We claim:

1. A holographic method for converting a first wave which is emitted at a given wavelength from a first three dimensional object into a second wave which may be of another physical nature than said first wave and which is identical to, or approximately equal to, a wave that another, possibly scaled in size, but geometrically similar object would emit at a chosen wavelength which may be different from said given wavelength, said method comprising producing a hologram and, during such production, mixing said first wave with a reference wave whose wavefront in the hologram recording plane is different from that of the actual reconstruction wave in the same recording plane, and combining at least the phases of these two wavefronts so as to compensate for imaging errors due to mutual inconsistencies between the wavelength ratio, the hologram scaling and the object scaling, and any displacement of the reconstructed object relative to the hologram.

2. A method as claimed in claim 1 wherein, the scaling of a recorded wavefront, the reference wave and/or the reconstruction wave is selected so that the wave field coming from a point source in said first object, after the scaling, has an optimal resemblance to the wave field from a point source in the geometrically similar object.

3. A method as claimed in claims 1 or 2, comprising producing said hologram synthetically, and converting a wave field $O(x_1,y_1)$ coming from a point source in said first object and recorded in the hologram plane at a wavelength $\lambda_1$ by means of a complex transmission function $R^*(x_1,y_1)$ which constitutes the reference wave, the conversion being described by the product $$O(x_1,y_1) \cdot R^*(x_1,y_1)$$

which should have an optimal approximation to the quantity:

$$\frac{e^{i\frac{2\pi}{\lambda_2}\sqrt{(x_i - x')^2 + (y_i - y')^2 + z_i^2}}}{\sqrt{(x_i - x')^2 + (y_i - y')^2 + z_i^2}}$$

wherein
$(x_1,y_1)$ are coordinates in the hologram plane during recording
$(x',y')$ are coordinates in the produced hologram, as $x'=(1/m)x_1$ and $y'=(1/m)y_1$, where m is a scaling factor which may be equal to 1,
$(x_i,y_i,z_i)$ are coordinates in the reconstructed object,
$\lambda_2$ is the reconstruction wavelength,
thereafter employing the converted wave field as input data to an equipment for the production of synthetic holograms, and thereafter performing reconstruction.

4. A method as claimed in claim 3, wherein the optimal approximation is obtained by requiring minimal square deviation (the $L^2$-norm) between the converted wave field and the wave field that ideally satisfies the conversion requirements with respect to the size, location, imaging quality, and wavelength of the reconstruction.

5. A method as claimed in claim 3, wherein the optimal approximation is obtained by requiring that the largest deviation of complex amplitude between the converted wave field and the wave field that ideally satisfies the conversion requirements with respect to the size, location, imaging quality, and wavelength of the reconstruction be a minimum.

6. A method as claimed in claim 3, wherein the optimal approximation is obtained by requiring that the area in the hologram plane in which the deviation in complex amplitude is less than a pre-chosen value between the converted wave field and the wave field that ideally satisfies the conversion requirements with respect to size, location, imaging quality, and wavelength of the reconstruction be a maximum.

7. A method as claimed in claim 3, wherein the phase and amplitude of the reference wave are given by the following formula:

$$R^*(x',y') = \frac{\sqrt{(x_{sl} - mx')^2 + (y_{sl} - my')^2 + z_{sl}^2}}{\sqrt{(x_{sl} - x')^2 + (y_{sl} - y')^2 + z_{sl}^2}} \cdot$$

$$e^{i[-k_1\sqrt{(x_{sl}-mx')^2+(y_{sl}-my')^2+z_{sl}^2} + k_2\sqrt{(x_{sl}-x')^2+(y_{sl}-y')^2+z_{sl}^2}]}$$

wherein
$R^*(x',y')$ is the reference wave,
$(x_{s1},y_{s1},z_{s1})$ are coordinates within said former object defining a reference point
$k_1 = 2\pi/\lambda_1$,
$k_2 = 2\pi/\lambda_2$, and the remaining symbols are as defined in claim 3.

8. A method as claimed in claim 7, wherein the amplitude of the reference wave is chosen to be equal to a constant.

9. A method as claimed in claim 1, wherein the conversion process is repeated a number of times, each time with a different displacement of the reconstructed object relative to the hologram in such a way that all holograms reconstruct the object in the same location.

* * * * *